June 19, 1962     J. T. L. BROWN     3,039,438

WET REST FOR INKING STYLUS

Filed Dec. 23, 1958

α < 90°

INVENTOR
J. T. L. BROWN
BY John C. Morris

ATTORNEY

United States Patent Office 3,039,438
Patented June 19, 1962

3,039,438
WET REST FOR INKING STYLUS
John T. L. Brown, Short Hills, N.J., assignor to Bell Telephone Laboratories, Incorporated, New York, N.Y., a corporation of New York
Filed Dec. 23, 1958, Ser. No. 782,572
1 Claim. (Cl. 120—57)

This invention relates, in general, to recording instruments and, in particular, to recording instruments employing inking styli.

It is, on the one hand, beneficial to use an inking stylus in recording instruments and, on the other hand, troublesome. Beneficially, clearly defined markings of a permanent character can be scribed on paper with a minimum application of stylus force on the paper. However, while the stylus is inactive, ink tends to dry at the tip of the stylus thereby obstructing the flow of ink to the stylus tip. Consequently, the stylus will fail to scribe ink markings on paper after a sufficiently long period of inactivity. The tendency of inking styli to become obstructed by dried ink amounts to a sizable economic burden. For example, in the public utilities and in the so-called process industries, it is notorious that many man-hours of corrective maintenance effort, as well as preventive maintenance effort, are devoted to the cleaning of recording instruments' inking styli.

Many investigators have searched for ways and means of obtaining an inking stylus that is capable of performing its marking function after long periods of inactivity. This search has continued for more than a half-century and, during that period, a variety of approaches to the problem's solution have been proposed. For example, it was proposed that the tip of the stylus be sealed during the inactive periods by resting the tip on a rubber-like surface which would adapt its contour to the stylus tip and thereby prevent the ink from drying and obstructing the ink channel within the stylus. For another example, it was proposed that a constant-volume variable-pressure pump be used for feeding ink through the ink channel of the stylus so that dried ink obstructions would be pushed aside by increased ink pressure. Other investigators, deciding to avoid the use of a stylus having an ink channel therewithin, employed relatively elaborate ink feed systems in conjunction with a solid stylus. For example, it was proposed that a solid stylus be immersed in a controlled level ink reservoir in such manner that the stylus tip would just protrude through the ink's surface and scribe ink markings on paper that moved over the tip of the stylus. For another example, it was proposed that a ball-point stylus be used in conjunction with a movable inking pad for applying an ink film to the rolling ball-point.

The objects of this invention include: the provision of means for enabling an inking stylus to perform its marking function after a long period of inactivity; and, the achievement of the aforesaid object with simple, reliable and economical means.

The invention, hereinafter illustrated by a specific embodiment, achieves the aforementioned objects by providing a rest member having ink-filled pores therein and a stylus having an ink-filled channel. The tip of the stylus, while inactive, is arranged to rest upon the rest member whereby the ink in the stylus channel is brought into contact with the ink in the rest member's pores. Thus, the ink at the tip of the stylus is prevented from drying and the stylus is thereby continuously ready for performing its marking function.

Other objects of the invention as well as the nature of the invention and its features will become apparent by referring to the following description and claim, taken in conjunction with the accompanying drawing, in which:

Figure 1:
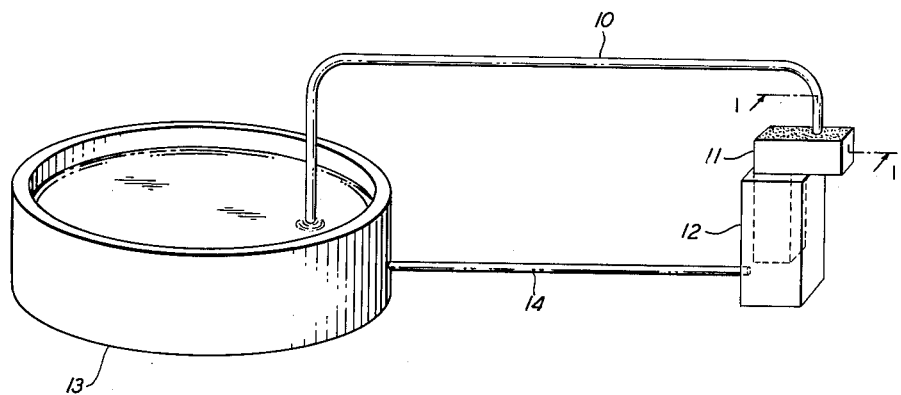
FIG. 1 is an elementary representation of an ink supply system, including an inking stylus, for use in recording instruments.

Referring now to the drawing, and especially to FIG. 1, the ink supply system there illustrated comprises: a stylus 10; a rest member 11 for the stylus tip; a container 12 for the rest member; an ink-filled reservoir 13 for supplying ink to the stylus and the container; and, a conduit 14 connecting the reservoir with the container. The stylus 10 is a tube having a small outside diameter and a capillary channel extending longitudinally therethrough. As shown in FIG. 1, the tube has a leg extending perpendicularly from each end. One leg is immersed in the ink in the reservoir 13 and the other leg, the stylus writing tip, is in contact with the top surface of the rest member 11. Whenever the stylus is inactive its tip is rested on the rest member 11 and whenever there is a demand for stylus activity the tip is moved from the rest member and placed in contact with a paper chart. For the sake of simplicity, the mechanism for supporting and moving the stylus, the paper chart and the mechanisms for moving the paper chart are not shown in the drawing. The nature and operation of these elements is well known to those who are familiar with recording instruments.

Figure 2:
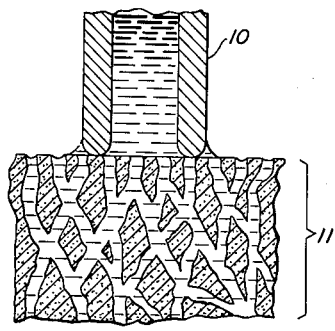
FIG. 2 is an enlarged view of a vertical cross-section, taken along the lines 1—1 in FIG. 1.
Figure 3:
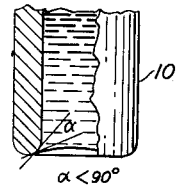
FIG. 3 is an enlarged view, partly cut away, of the tip portion of an inking stylus.

Ink from the reservoir 13 is transmitted through the capillary channel of the stylus to the tip of the stylus. This transmission is accomplished by capillary action. Ink is also transmitted from the reservoir 13 through the conduit 14 to the container 12. As is indicated in FIG. 1, the rest member 11 is fitted into the container 12. The rest member 11 does not fill the container 12 completely and, as a consequence, the ink collects at the bottom portion of the container. The rest member 11, being formed from a porous material, has a plurality of capillary channels therein as is indicated in FIG. 2. The ink at the bottom of the container 12 is in contact with the bottom portion of the rest member 12 and is conducted upwardly through the rest member's capillary channels to the top surface of the rest member. This transmission is accomplished by capillary action. As is shown in FIG. 3, the ink at the tip of the stylus forms a concave spherical meniscus. Similarly, the ink at the top of the rest member's channels forms a concave spherical meniscus. FIG. 2 illustrates this condition; i.e., the ink in those rest member channels not in contact with the tip of the stylus has a concave meniscus. Thus, the ink meniscus at the tip of the stylus is, under static conditions, downwardly concave and the ink meniscus at the top of the rest member channels is, under static conditions, upwardly concave. Therefore, if the stylus tip is rested gently on the rest member the ink in the stylus will not make contact with the ink in the rest member's channels. However, if the stylus tip strikes the rest member with sufficient velocity, the ink in the stylus will be urged into contact with the ink in the rest member's channels. FIG. 2 shows the tip of the stylus 10 in contact with the rest member 11; the ink at the tip portion of the stylus being in contact with the ink at the top portions of the channels in the rest member.

The stylus 10 is made from a material which is "wetted" by ink; i.e., the adhesive force between the ink and the stylus material produces a contact angle $\alpha$, as indicated in FIG. 3, which is smaller than 90°. Stainless steel tubing, for example, is a material suitable for the fabrication of the stylus.

The rest member 11 is made from a porous material, i.e., a material having a plurality of capillary channels therein. The material is one which is "wetted" by ink. A ceramic material, or the like, is particularly suitable. For a specific example, a ceramic material of the steatite type as disclosed in Example 1 in the specification of United States Patent 2,332,343, granted to M. D. Rigterink on October 19, 1943, is a suitable material if underfired to the extent that it has a porosity corresponding to a water absorption of about 10 percent. The rest member 11, as shown in FIG. 1, can have its surfaces, with the exception of the top and bottom surfaces, glazed with a relatively non-porous material such as glass or the like. Advantageously, the ink will be conducted from the bottom of the rest member to the top of the rest member.

One example of a workable arrangement of the elements, shown in FIG. 1, is the following: a stainless steel stylus having a capillary channel of 0.02 inch inside diameter; the tip of the stylus being elevated 0.5 inch above the ink surface in the reservoir; and, a rest member of porous ceramic material, as above identified.

Although the invention has been described in terms of a specific embodiment, it should be understood that the present disclosure has been made by way of example only and that many changes in the details of construction and the combination and arrangements of parts may be made without departing from the spirit and the scope of the invention as is hereinafter claimed.

What is claimed is:

Recording apparatus comprising: an ink-filled reservoir; a stylus member of ink-wettable material including a writing tip and a capillary channel through the stylus member, the capillary channel defining an inlet orifice in one end of the stylus member and an outlet orifice in the writing tip, the inlet orifice being positioned in the reservoir whereby ink is transmitted by capillary action to the outlet orifice in the writing tip, the writing tip having an annular portion thereof surrounding the outlet orifice; a rest member of hard, ink-wettable material having a plurality of pores therethrough and a flat-surface area thereon; means for conducting ink from the reservoir to the rest member thereby allowing ink to fill the pores by capillary action, the stylus member's writing tip being arranged relative to the reservoir and rest member so that the ink meniscus in the writing tip's outlet orifice is downwardly concave and the ink menisci in the pores at the rest member's flat surface area are upwardly concave; and, the writing tip's annular portion surrounding the outlet orifice has face-to-face contact with the rest member's flat surface area and covers a number of pores on the rest member's flat-surface area, the impact of the annular portion on the flat surface area causing the ink at the writing tip's outlet orifice to establish a non-flow connection with the ink in the pores covered by the writing tip's outlet orifice.

References Cited in the file of this patent

UNITED STATES PATENTS

| | | |
|---|---|---|
| 1,967,900 | Perry | July 24, 1934 |
| 2,620,499 | Dressel | Dec. 9, 1952 |
| 2,708,904 | Rhoades | May 24, 1955 |
| 2,758,568 | Steinberg | Aug. 14, 1956 |